Figure 28:
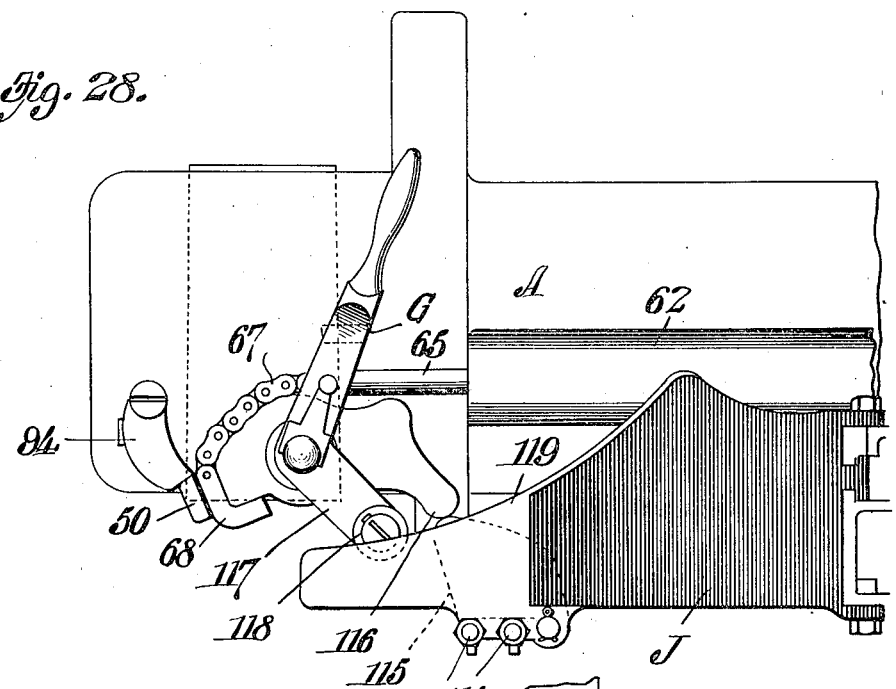

A. ADELMAN AND H. J. STAMBAUGH.
RECOIL OPERATED GUN.
APPLICATION FILED JULY 26, 1916.
1,359,454.
Patented Nov. 16, 1920.
14 SHEETS—SHEET 1.
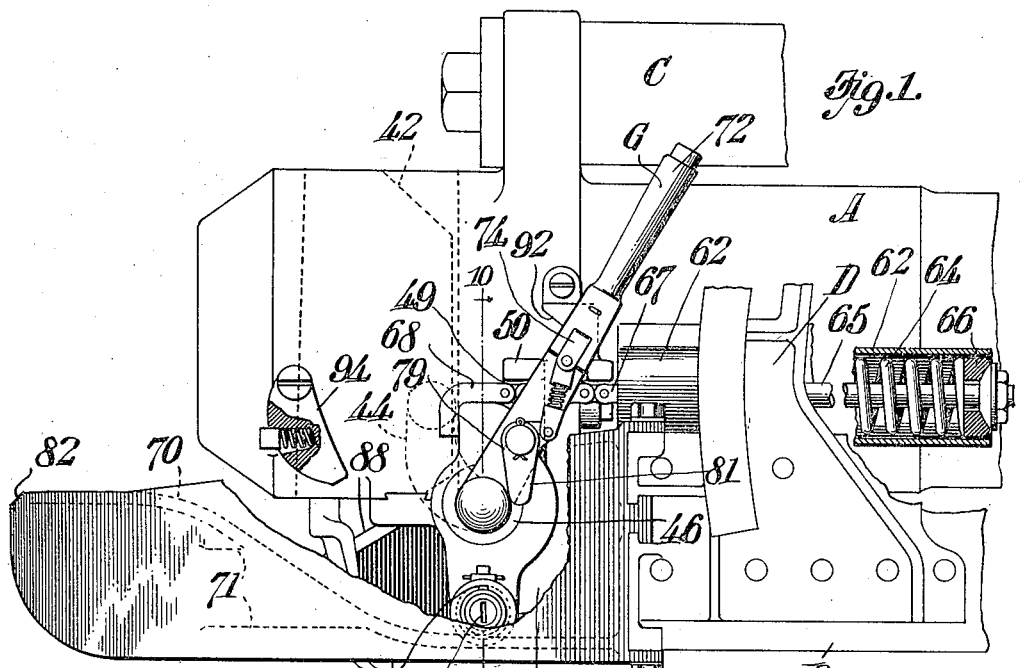
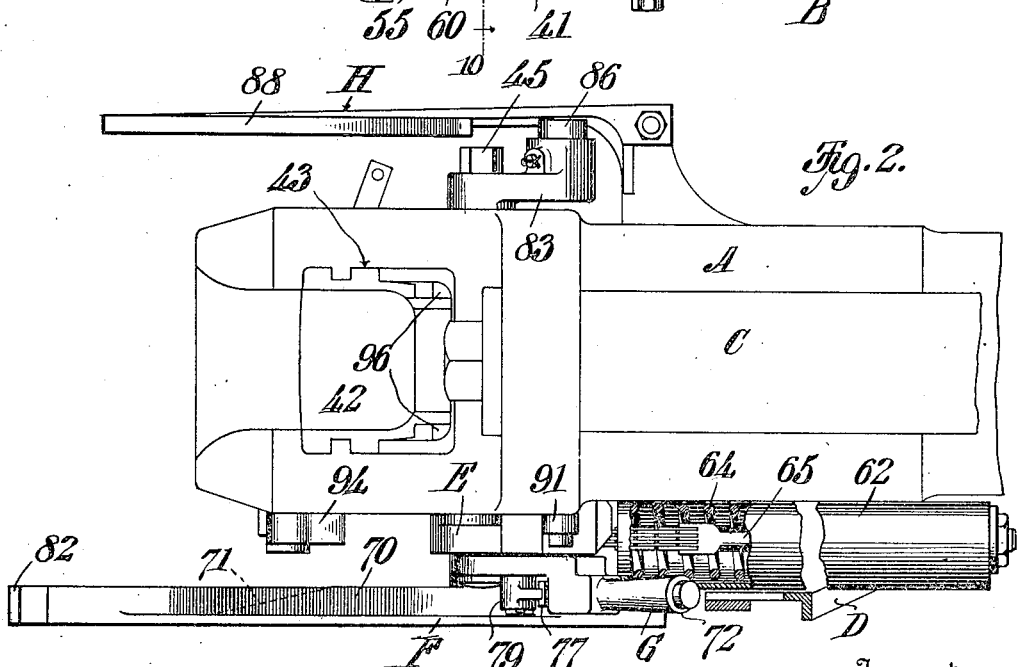

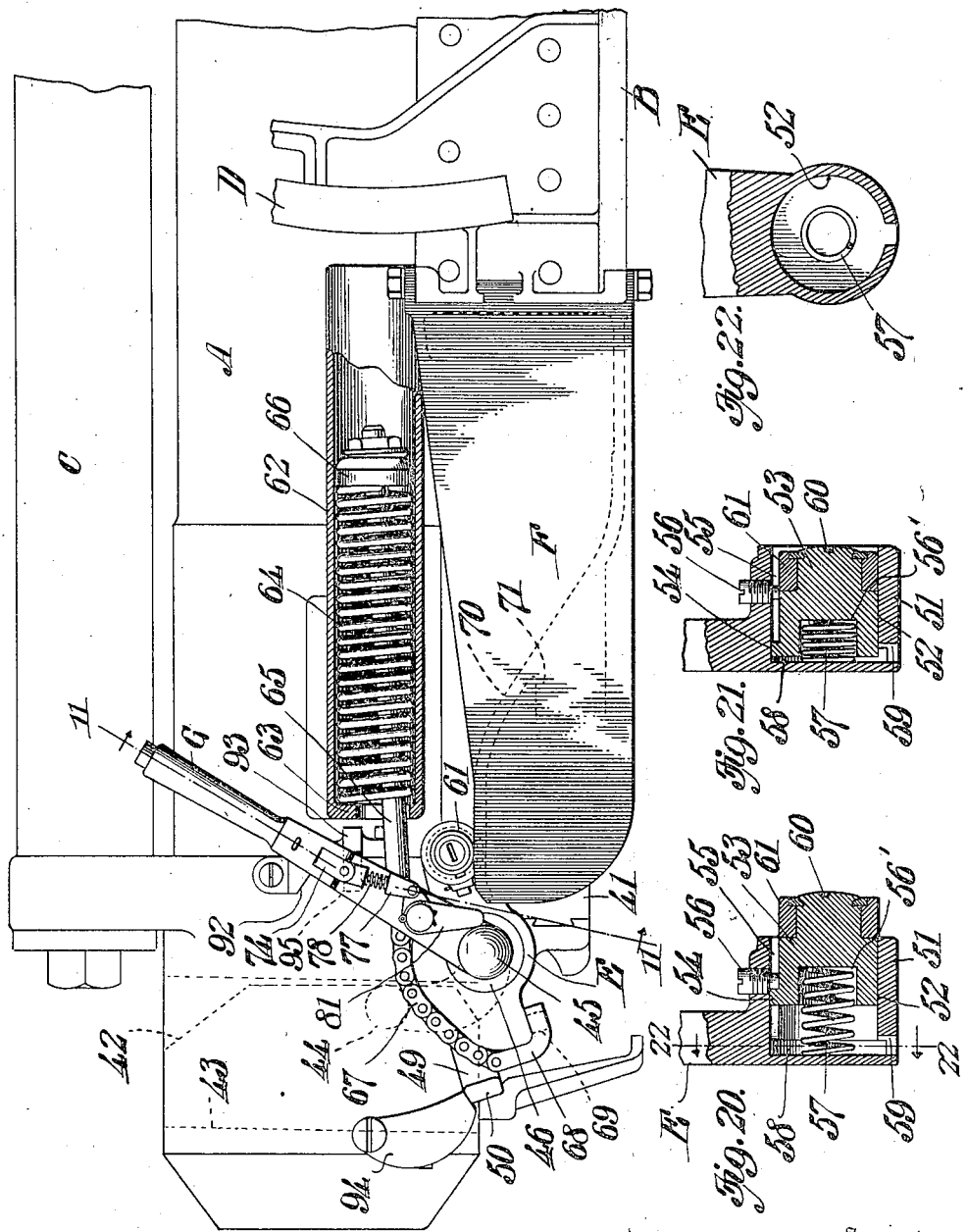

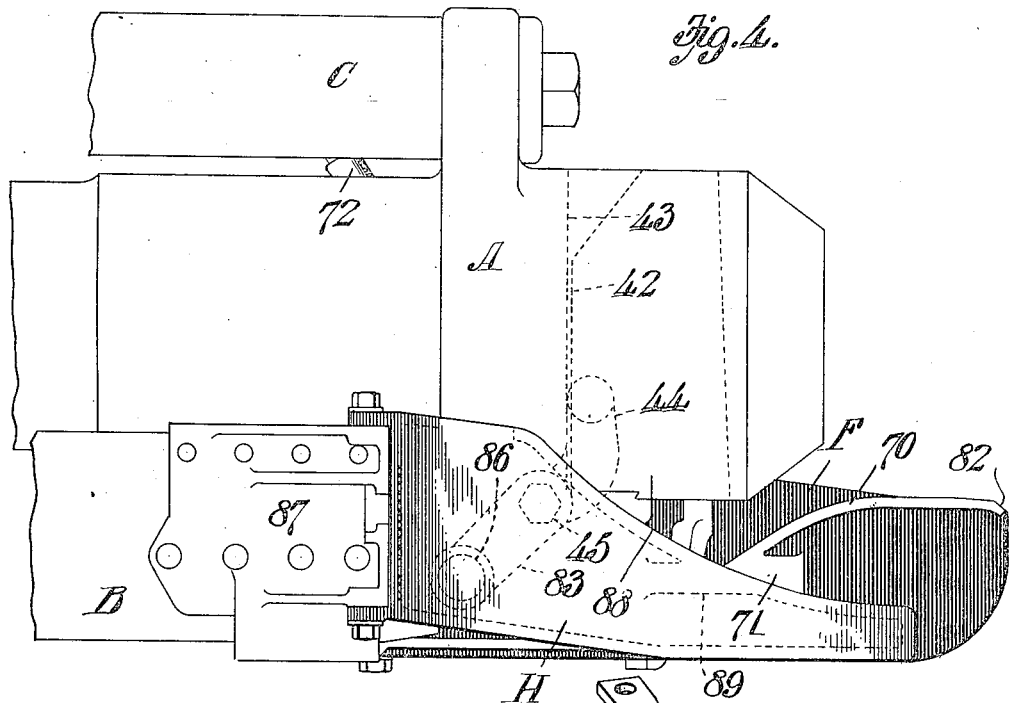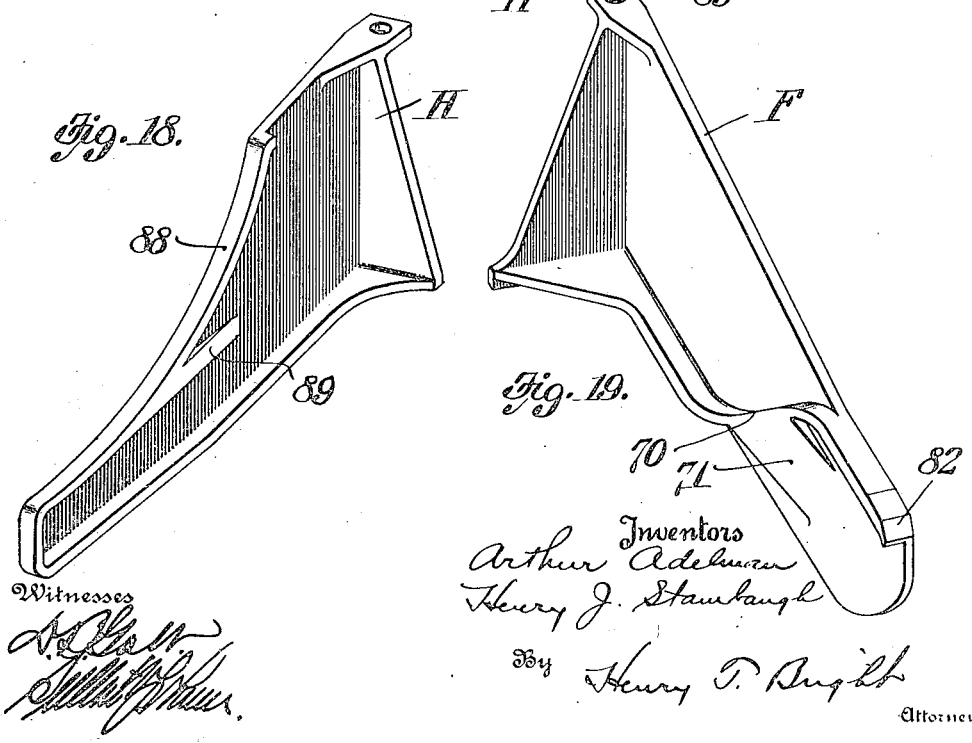

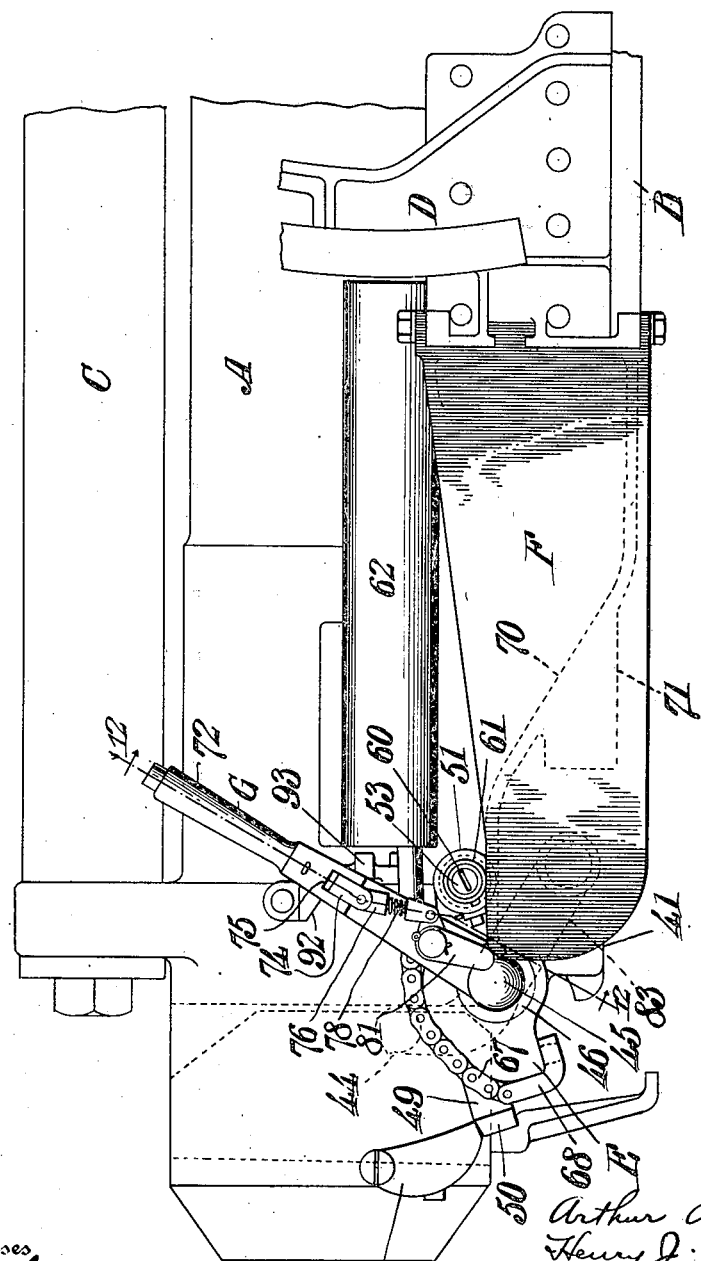

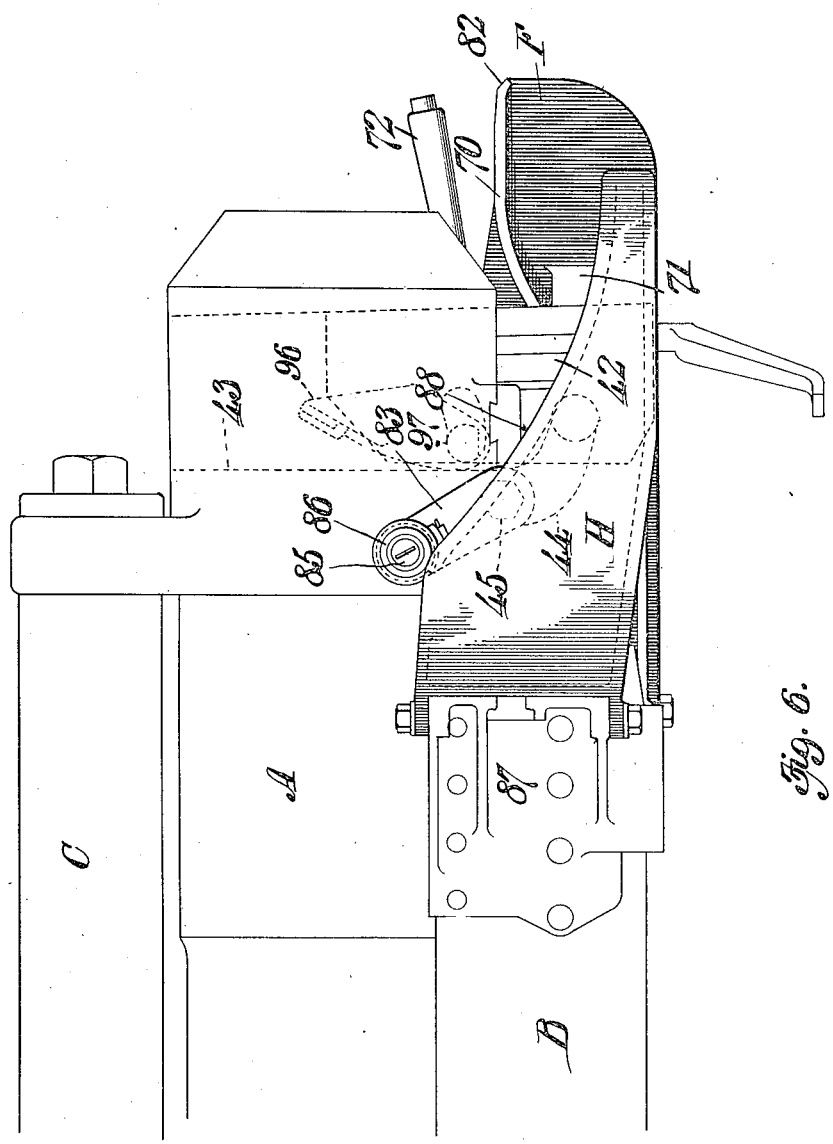

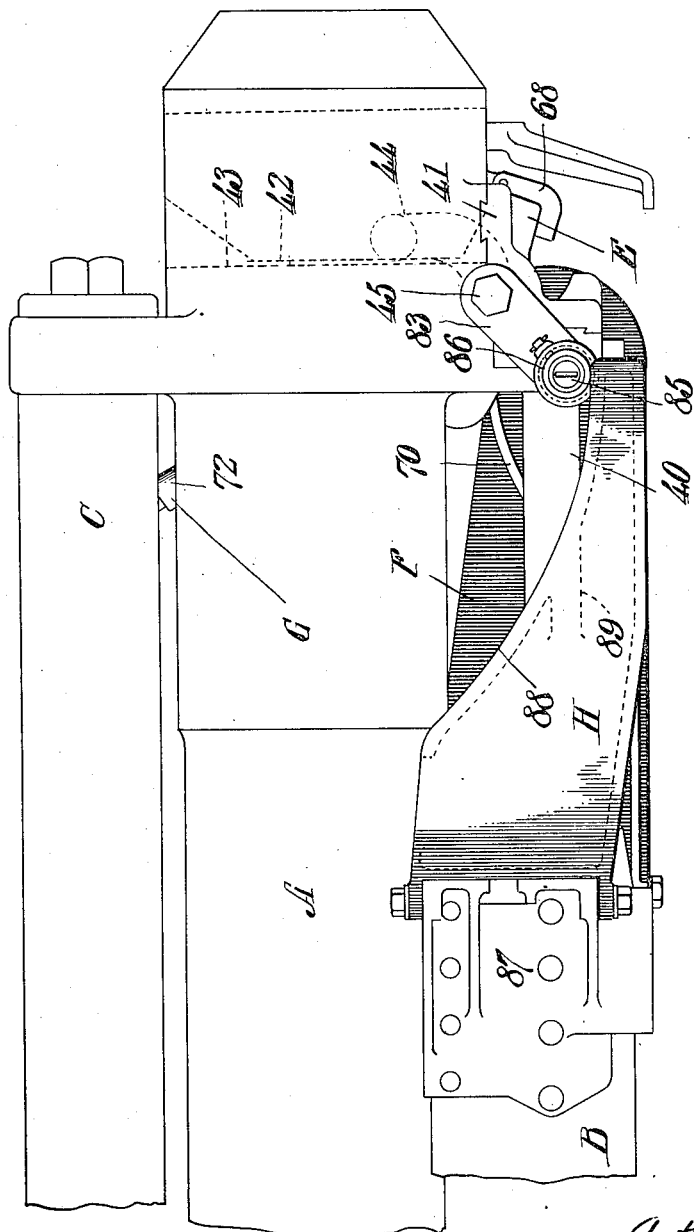

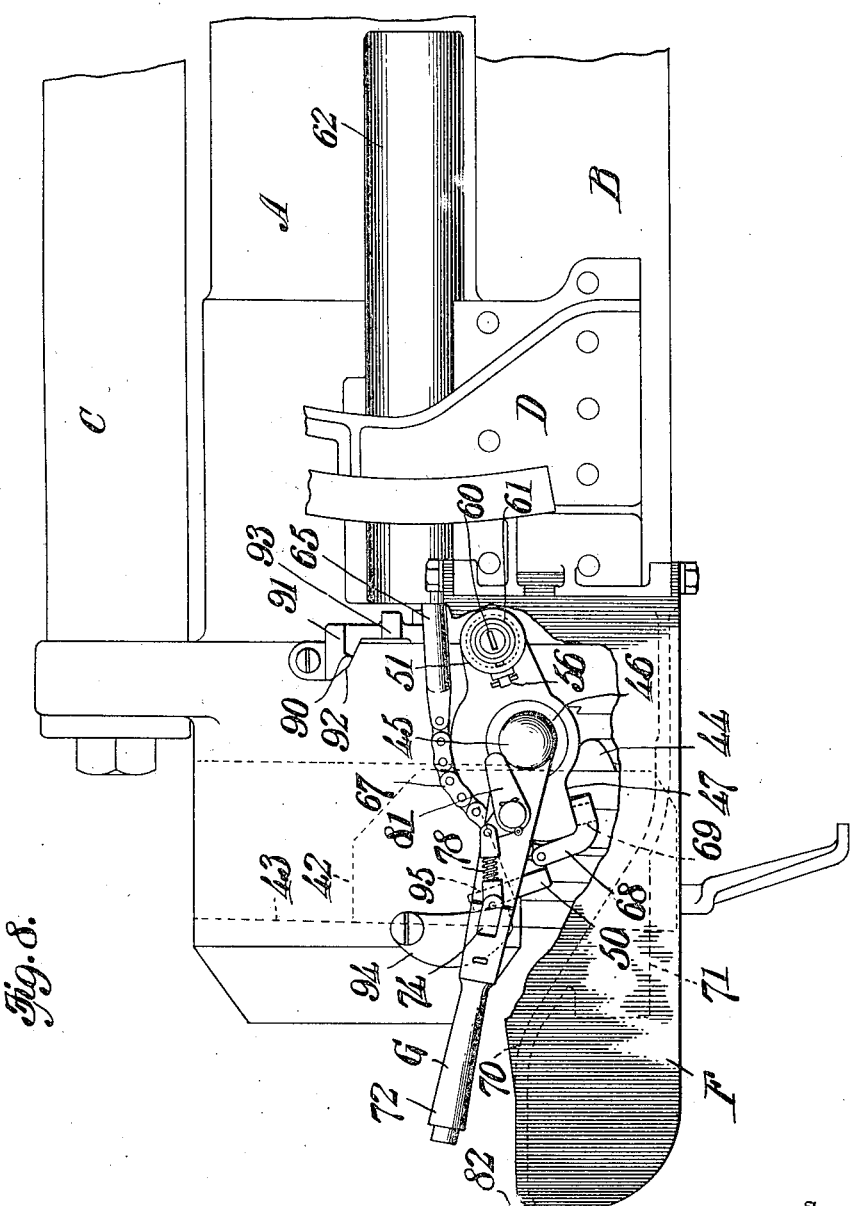

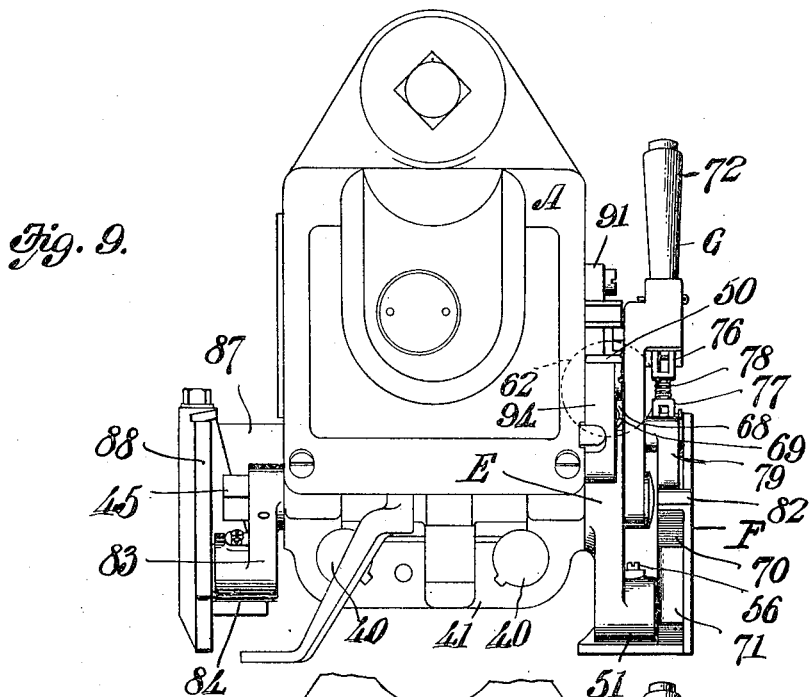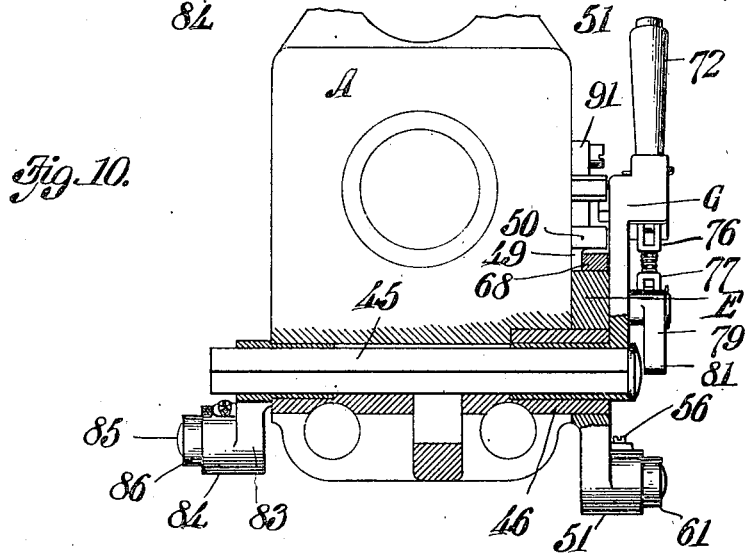

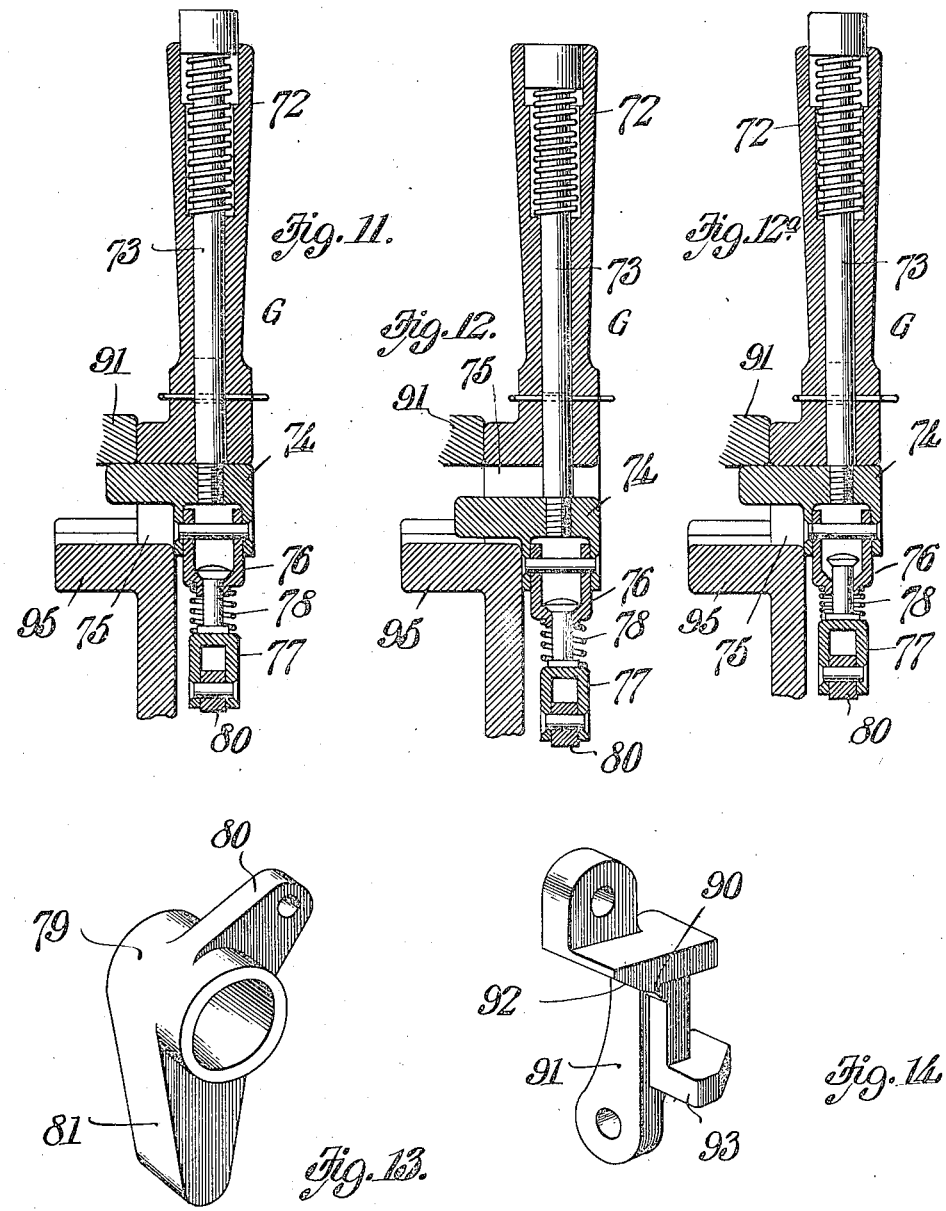

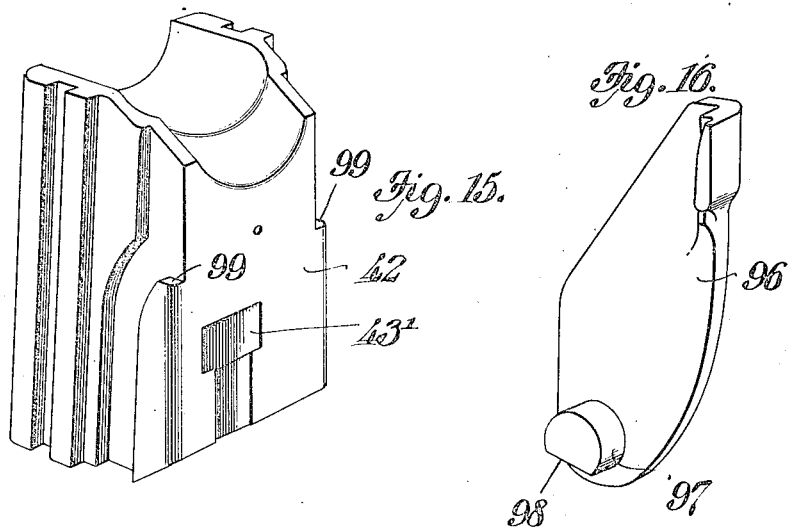
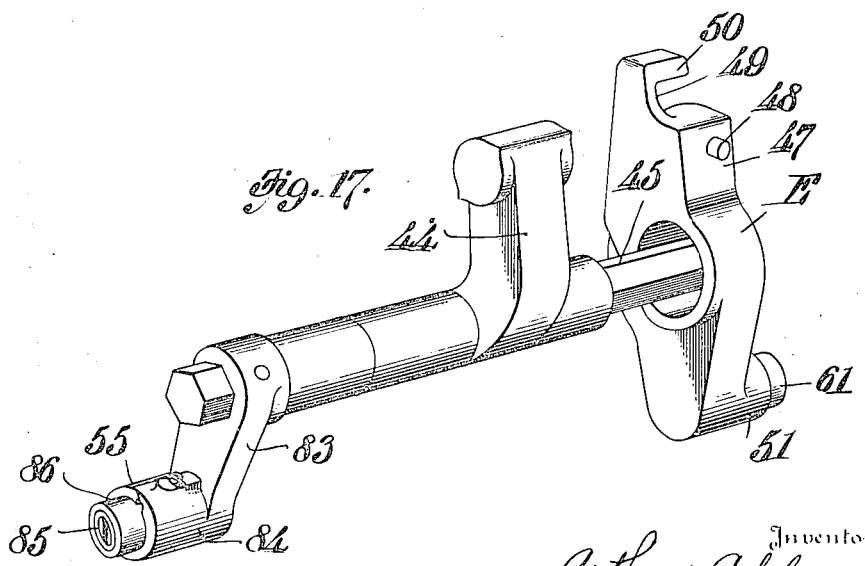

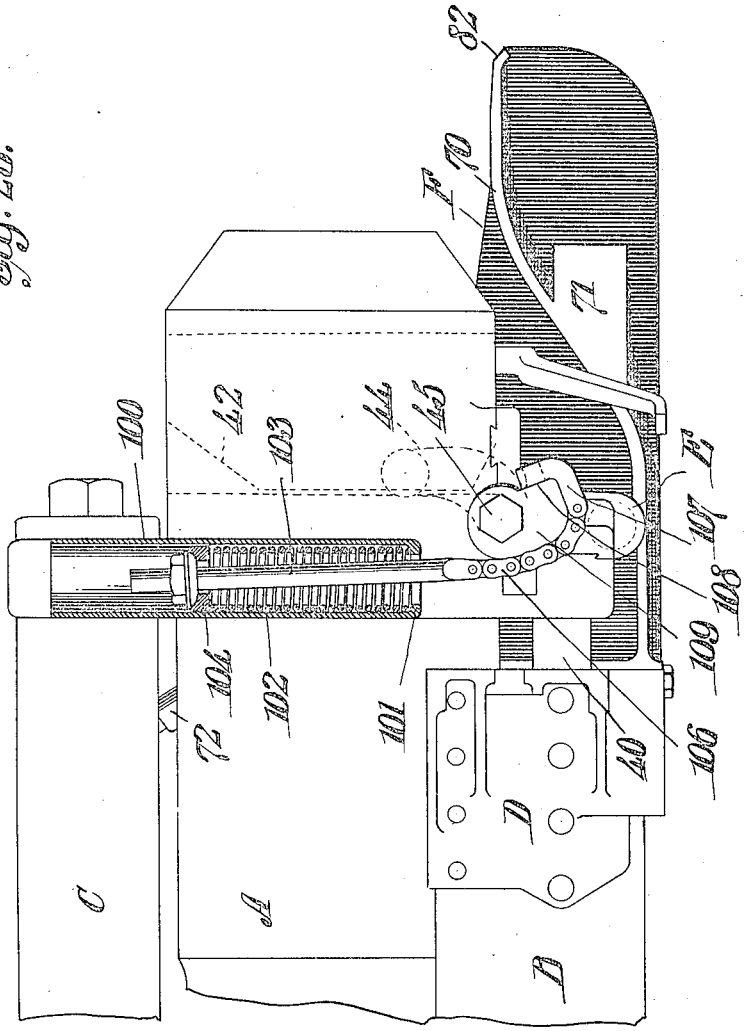

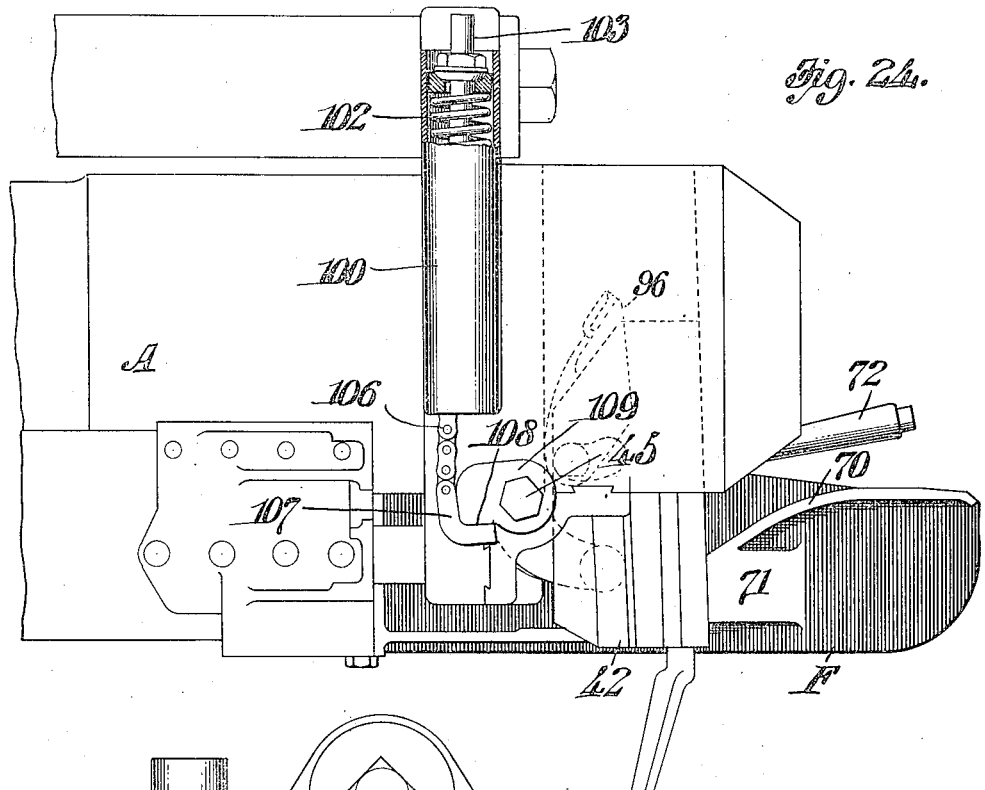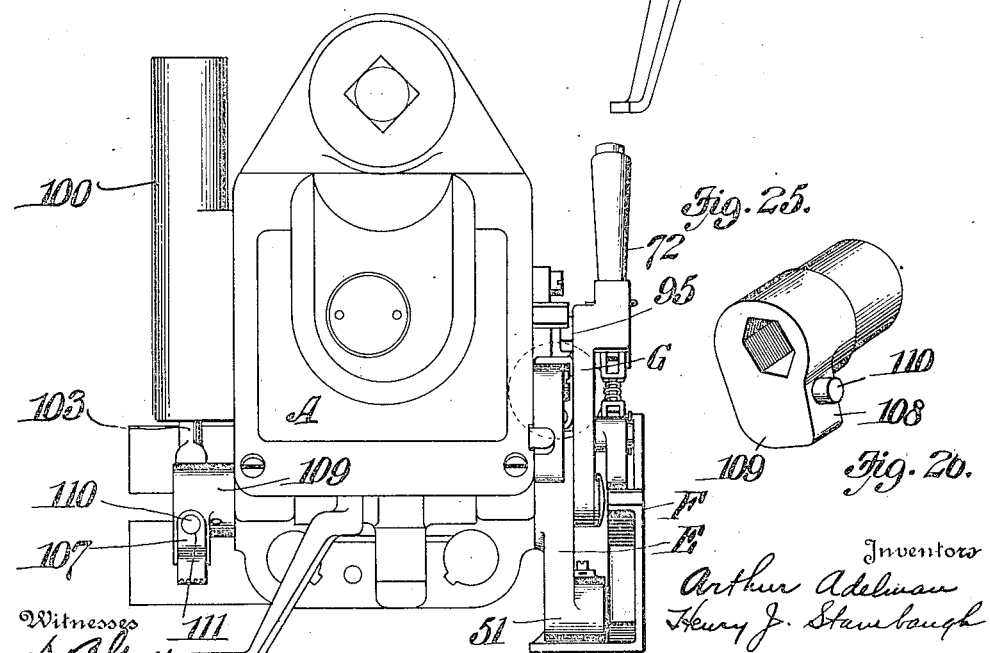

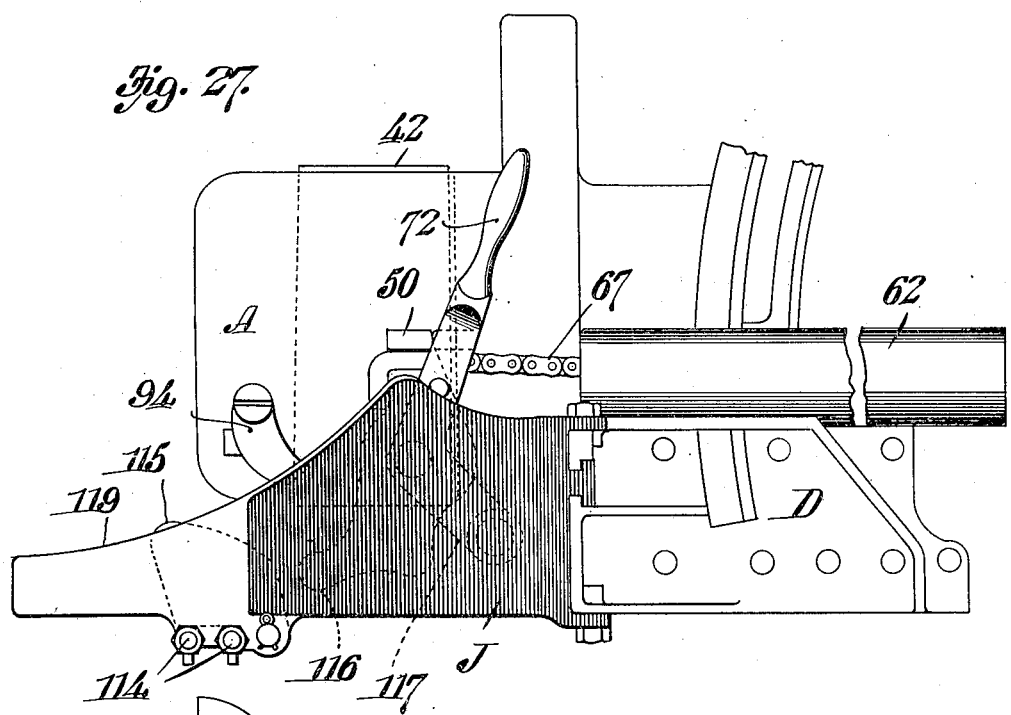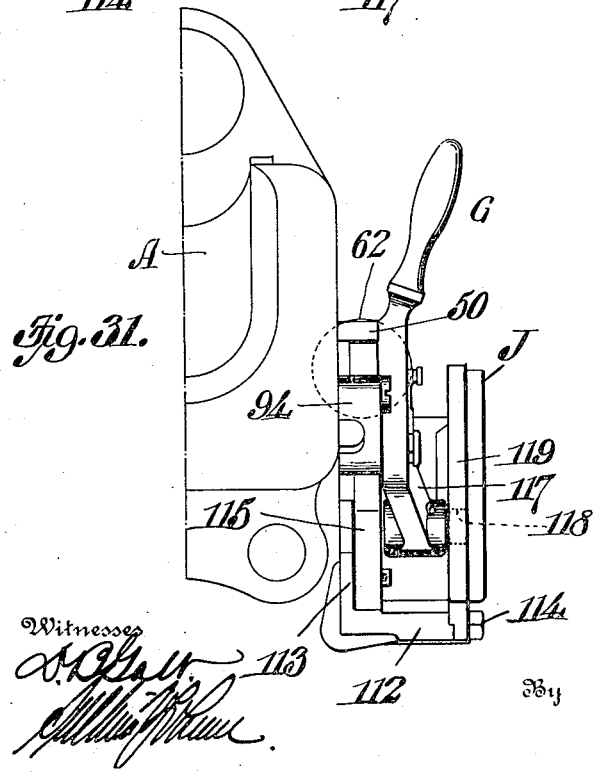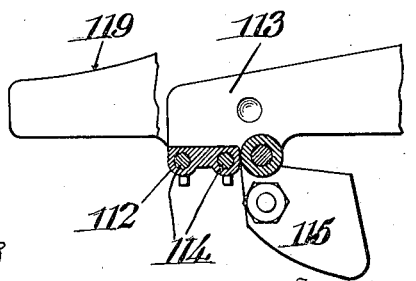

UNITED STATES PATENT OFFICE.

ARTHUR ADELMAN AND HENRY J. STAMBAUGH, OF WASHINGTON, DISTRICT OF COLUMBIA, ASSIGNORS TO UNITED STATES ORDNANCE COMPANY, OF WASHINGTON, DISTRICT OF COLUMBIA, A CORPORATION OF VIRGINIA.

RECOIL-OPERATED GUN.

1,359,454.   Specification of Letters Patent.   Patented Nov. 16, 1920.

Application filed July 26, 1916. Serial No. 111,351.

*To all whom it may concern:*

Be it known that we, ARTHUR ADELMAN and HENRY J. STAMBAUGH, citizens of the United States, and residents of the city of Washington, in the District of Columbia, have invented certain new and useful Improvements in Recoil-Operated Guns, of which the following is a specification.

Where guns are mounted on mobile carriages the strength of the counter-recoil springs is usually limited in order to save weight and to secure the necessary stability when firing at low angles of elevation. Furthermore the velocity of the gun in returning to battery varies considerably between the various angles of elevation used, this being especially true in the use of the variable recoil type of carriage; and these variations in velocity, in the case of recoil-operated guns, will in many instances cause the breech mechanism to be opened with the presence of undesirable and objectionable shocks and jars on various parts. The limitation in strength of the counter-recoil springs previously referred to necessitates that a minimum amount of work be imposed upon these springs in addition to the returning of the gun to battery.

It is therefore the purpose of our invention to provide a semi-automatic breech mechanism for guns mounted upon mobile carriages, which will operate without excessive shock when used in connection with long recoil mounts where the gun acquires a considerable velocity in recoil and counter-recoil; to provide a semi-automatic mechanism which will operate on both short and long recoil mounts without changing adjustments in order that it may be suitable for use in connection with guns mounted on modern variable recoil carriages which combine the problems of long, short and intermediate recoils; to provide means operated during recoil to store up energy for effecting either the partial or entire operation of the mechanism independent of the counter-recoil springs; to eliminate sliding parts between the gun and mount which must remain in contact throughout recoil and thereby avoid the use of long and heavy parts in the construction; to effect the operation of the mechanism in such a way as to reduce to a minimum the energy required of the counter-recoil springs; to provide a quick and simple means for throwing the automatic features of the mechanism out of action so as to permit hand operation; and to generally improve mechanisms of this type for use in connection with mobile carriages.

Figure 29:
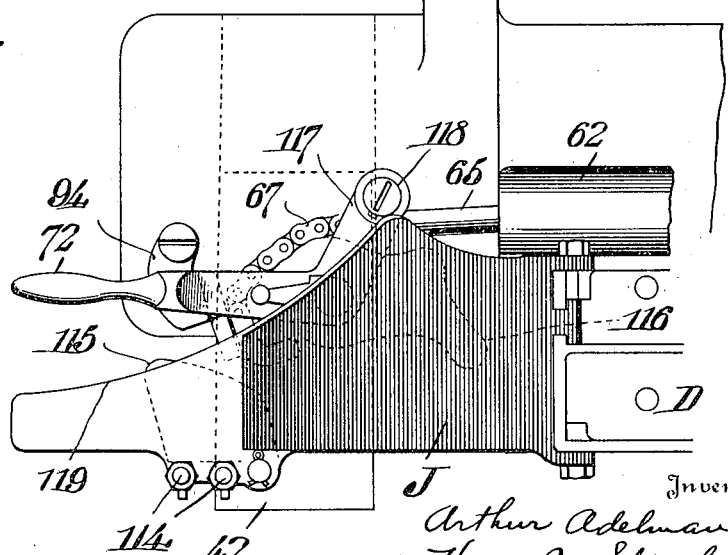

In the drawings chosen to illustrate our invention, the scope whereof is set forth in the claims:

Figure 1 is a side elevation of the breech end of a gun embodying our invention, same being shown partly broken away and the parts being in the position they would occupy when the breech block is closed and the closing spring deënergized;

Fig. 2, a plan view of what is shown in Fig. 1;

Fig. 3, a view similar to Fig. 1 showing the parts in the position they would occupy when the gun has partly recoiled, the closing spring being fully energized;

Fig. 4, a view in elevation looking at the left hand side of the gun with the parts in the position shown in Fig. 1;

Fig. 5, a view similar to Fig. 1 with the gun in counter-recoil and the parts in the position they would occupy just as the mechanism is released for movement under the action of the opening cam device;

Fig. 6, a view similar to Fig. 4 with the parts in the position they would occupy when the block is fully opened and the gun almost at battery;

Fig. 7, a view similar to Fig. 4 with the parts in the position they would occupy when the opening cam device has just started to operate the breech block to open position;

Fig. 8, a view similar to Fig. 1 with the breech block fully opened and the gun in battery;

Fig. 9, a rear elevation of the gun with the parts in the position shown in Fig. 1;

Fig. 10, a section on the line 10—10 of Fig. 1;

Fig. 11, a section on the line 11—11 of Fig. 3;

Fig. 12, a section on the line 12—12 of Fig. 5;

Fig. 12ª, a view similar to Fig. 12 with the latch parts in the position they would occupy during a portion of recoil;

Fig. 13, a perspective view of the latch operating pawl;

Fig. 14, a perspective view of the operating handle latch catch;

Fig. 15, a perspective view of the breech block;

Fig. 16, a perspective view looking at the inner face of one of the extractors;

Fig. 17, a perspective view of the operating shaft and associated parts;

Fig. 18, a perspective view looking at the inner face of the left hand cam plate;

Fig. 19, a perspective view looking at the inner face of the right hand cam plate;

Fig. 20, a longitudinal section through one of the cam rollers and adjacent parts;

Fig. 21, a view similar to Fig. 20 with the cam roller in inactive position;

Fig. 22, a section on the line 22—22 of Fig. 20;

Fig. 23, a view in elevation partly broken away looking at the left hand side of the gun and showing a modified form of our invention, the parts being in the position they would occupy when the breech block is closed and the closing spring in its minimum energized condition;

Fig. 24, a view similar to Fig. 23 with the parts in the position they would occupy when the breech block is opened and the gun in battery;

Fig. 25, a rear elevation of what is shown in Fig. 23;

Fig. 26, a perspective view of the opening spring arm;

Fig. 27, a side elevation of the breech end of a gun showing another modified form of our invention, the gun being in battery;

Fig. 28, a view similar to Fig. 27 showing the position of the parts just as the closing spring is fully energized during recoil;

Fig. 29, a view similar to Fig. 27 showing the position of the parts just as the opening of the block is completed during counter-recoil;

Fig. 30, a detail view showing the compressor pawl cam swung to inactive position, and Fig. 31, a partial rear elevation of what is shown in Fig. 27.

Referring to the drawings and particularly to Figs. 1 to 22 inclusive A indicates the gun body, B the rocking cradle in which the gun is mounted for longitudinal movement during recoil and counter-recoil, C the recoil brake, and D the range scale bracket which is secured to the cradle B. Housed in the cradle B are suitable spring operated counter-recoil devices for returning the gun to battery after recoil. The piston elements of these spring operated counter-recoil devices are shown at 40 and the rear ends of these piston elements are suitably secured to a depending portion 41 of the gun. The parts previously referred to are well known in the art and can be of any desired form, construction and arrangement.

The invention is shown associated with a vertically sliding wedge block type of mechanism but it will be understood that same can be applied to the screw block type of mechanism without altering the principles involved or departing from the spirit of the invention. The breech mechanism herein shown comprises a wedge block 42 mounted for sliding movement in a vertical passage 43 provided in the gun. This block 42 is of well known construction and is provided with the usual cavity 43' in which operates the free end of an operating arm 44 fixed on an operating shaft 45, the latter being suitably journaled in the gun A transversely of the latter. By rotating the shaft 45 to the left in Fig. 1 the free end of the operating arm 44 will coact with the surface of the cavity 43' to move the block 42 downwardly and open the breech, while reverse rotation of the shaft 45 will raise the block 42 vertically and close the breech as will be obvious. Surrounding the shaft 45 and mounted in the gun A is a fixed projection 46 on which is rotatably mounted adjacent the right hand side of the gun a spring compressor pawl E having a flat surface 47 provided with a lug 48 for a purpose that will presently appear. One end of this pawl E is reduced as at 49 and the free end of this reduced portion is provided with a lateral extension 50 spaced from the main body portion of the pawl. The end of the pawl E remote from the reduced portion 49 is extended laterally as at 51 and provided with a recess 52 in which is slidably mounted a plunger 53 held against axial rotation by a lug 54 formed on the plunger and engaged in a groove 55 formed in the wall of the recess 52. Outward movement of the plunger is limited by engagement of the lug 54 with a screw 56 mounted in the extension 51. The inner end of the plunger 53 is provided with a recess 56' in which is seated one end of a spring 57, the other end of said spring bearing against the inner wall of the recess 52. The side wall of the recess 52 at the inner end of the latter is provided with an annular groove 58 and the wall of this groove is provided with a recess 59. The outer end of the plunger 53 is provided with a groove 60 for the reception of a screw driver or similar tool when it is desired to force the plunger 53 to the position shown in Fig. 21. When the plunger is in the position shown in Fig. 21 the same is rotated axially until the lug 54 registers with the recess 59 when the plunger is released to permit the lug to enter the recess 59 and thus complete the locking of the plunger in its inactive position. Rotatably mounted on the outer end of the plunger 53 is a roller 61 the purpose of which will presently appear. Detachably secured to the right hand side of the gun A and extending longitudinally of the latter is a tubular member 62 the rear end of which is provided with an interior flange 63. Housed in the member 62 is a longitudinally compressible closing spring 64 the rear end of which seats against the flange 63. Extending through the spring 64 is a rod 65 which carries on its forward end a piston 66 engaged by the forward end of the spring 64. The rear end of the rod 65 has secured thereto one end of a chain 67 while the other end of said chain is formed by an L-shaped member 68 one arm of which engages the flat face 47 of the compressor pawl E and is provided with an opening 69 which receives the stud or lug 48 to complete connection between the chain 67 and the compressor pawl E. Disposed on the right hand side of the gun A and having its forward end secured to the range scale bracket D is a cam plate F provided on its inner side with cam surfaces 70 and 71, the former being engaged by the roller 61 during recoil and the latter under certain conditions by the outer end of the plunger 53 during counter-recoil.

Fixed on the shaft 45 outwardly of the compressor pawl E is an operating handle G having an offset tubular upper end 72 in which is slidably mounted a spring plunger 73 which has fixed on its inner end an operating handle latch 74 which projects through a transverse opening 75 formed in the operating handle at the inner end of the offset portion 72. Pivoted to the latch 74 is one end of a link formed of slidably connected sections 76 and 77, which sections are normally held at the limit of their movement away from each other by an interposed spring 78. Pivotally mounted on the operating handle G inwardly of the section 77 is a latch operating pawl 79 including arms 80 and 81 the former of which is pivotally connected to the section 77 while the latter is adapted to coöperate during counter-recoil with a beveled face 82 on the cam plate F for the purpose of releasing the latch 74 as will hereinafter appear.

Fixed on the end of the shaft 45 opposite to the handle G is an operating lever 83 provided with a lateral extension 84 in which is yieldingly mounted a plunger 85 carrying a roller 86. The construction and arrangement of the plunger 85 is identical to the construction and arrangement of the plunger 53 and for this reason will not be described in detail. Mounted on the left hand side of the cradle B is a bracket 87 to which is secured the forward end of a cam plate H. This plate is provided with cam surfaces 88 and 89 with which latter the plunger 85 is adapted to coöperate during recoil for the purpose of forcing the roller 86 to inactive position, while the surface 88 is engaged by the roller 86 during counter-recoil for the purpose of rotating the shaft 45 to effect automatic opening of the breech block 42.

The latch 74 normally holds the operating lever G against movement from the position shown in Fig. 1 to the position shown in Fig. 8 by engagement with a holding surface 90 formed on a stop member 91, said member being secured to the gun as shown in Fig. 8. The member 91 is also provided with a beveled surface 92 which is engaged by the latch 74 during closing of the block 42 so as to move said latch to a position to permit same to engage with the surface 90. The member 91 is also provided with a projecting portion 93 which is engaged by the operating handle G at the termination of the closing of the block 42 so as to act as a buffer for preventing excessive strain on the connection between the handle and the shaft 45.

Pivotally mounted on the right hand side of the gun is a spring operated compressor latch 94 beneath which the lateral extension 50 of the compressor pawl E is adapted to engage during recoil to lock the closing spring 64 compressed. The operating handle G is provided on its inner side with a projection 95 which is adapted to coöperate with the latch 94 at the termination of the block opening movement of the handle to release said latch from engagement with the lateral extension 50 the projection 95 remaining in front of the extension 50 so that any movement of the compressor pawl under the influence of the spring 64 will impart closing movement to the handle G. The mechanism of course embodies the usual extractors 96 having pintles 97 provided with the usual flat face 98 which engage over a flat face 99 on the block 42 when the latter is opened for the purpose of securing the block against closing movement. The feeding of a charge to the gun serves to rock the extractors 96 sufficiently to disengage the surface 98 from the surface 99 and thus release the block for closing movement as is well known.

In operation, assuming the parts to be in the position shown in Fig. 1, when the gun is fired the resulting recoil will cause the roller 61 to move along the cam surface 70 and effect rotation of the compressor pawl E to energize the closing spring 64. When the roller 61 reaches the rear end of the surface 70 the lateral extension 50 of the compressor pawl will automatically engage beneath the latch 94 and the spring 64 will thus be locked in its maximum compressed state. During the recoil of the gun just referred to the arm 81 of the pawl 79 will engage the substantially horizontal rear portion of the surface 70 and said pawl will be rocked on its pivot. Owing to the sliding connection between the sections 76 and 77 of the link which connects the pawl 79 and the latch 74 this movement of the pawl 79 will simply move the section 77 of said link as shown in Fig. 12ᵃ and will be ineffective with respect to the latch 74. Referring now to the left hand side of the gun it will be obvious that during the recoil the plunger 85 will engage the cam surface 89 on the cam plate H and thus forced inwardly to move the roller 86 to inactive position until the plunger 85 and roller 86 have cleared the cam plate. This status of the parts continues until the recoil of the gun has been completed and the counter-recoil initiated. During this counter-recoil of the gun the arm 81 of the pawl 79 engages the beveled surface 82 on the cam plate F and as a result of this engagement the pawl 79 is rocked so as to operate the latch 74 to a position that will disengage same from the holding surface 90. Immediately succeeding this condition the roller 86 begins to coact with the cam surface 88 of the plate H and this coaction between said roller and cam surface continues until sufficient rotation has been imparted to the shaft 45 to open the block 42. It will be noted that the cam surface 88 is a gradual one so that the opening of the block 42 is effected without violent shock or jar upon the parts irrespective of the velocity of the gun in counter-recoil, the initial opening movement of the block being very slow and increasing in increment as the opening progresses. During this opening of the block 42 it will be obvious that the operating handle G will move from the position shown in Fig. 1 to the position shown in Fig. 8 and disengage the latch 94 from the extension 50 on the compressor pawl E. Under these conditions the closing spring 64 would ordinarily operate the block 42 to closed position through the pawl E and handle G but it will be observed that the extractors 96 have locked the block in open position in the manner previously referred to. The gun therefore returns to battery with the block 42 in open position. Upon feeding the charge to the gun the extractors 96 will be rocked by the feeding movement of the charge to release the block and the latter will then be operated to closed position by the spring 64 acting through the pawl E and handle G.

The structure previously described is capable of a number of different operations. For instance, if it is desired to open and close the block by hand it is only necessary to remove the closing spring 64 and operate the plunger 85 to inactive position. Under these conditions the plunger 73 is forced inwardly by the thumb in order to release the latch 74 before attempting to impart opening rotation to the shaft 45 through the medium of the handle G. By operating the plunger 85 to inactive position and leaving the remaining parts as originally described the spring 64 can be energized on recoil and the block 42 opened by hand as in such an instance the roller 86 will not engage the surface 88. By operating both the plunger 53 and the plunger 85 to inactive position the energization of the spring 64 and the opening of the block 42 can be effected by hand. By removing the closing spring the block 42 can be automatically opened on counter-recoil and then closed by hand.

In cases where the recoil of the gun is comparatively short the latch 94 can be dispensed with, the surface 70 being made of such length that the roller 61 never leaves it, the block 42 being opened while the roller is on the substantially horizontal portion of the surface 70. Should the latch 94 fail to hold the spring 64 compressed for any reason so that the roller 61 would not ride over the top of the cam plate F there is provided a safety feature in that the roller 61 and plunger 53 pass inside of the plate F and the latter engages the inclined surface 71 which forces the roller and plunger inwardly against the spring 57 so that they will pass forward without injury to the parts.

By the construction previously described it will be obvious that we are enabled to utilize a considerable length of recoil to effect a relatively small compression of the spring 64 and thus reduce shocks and jars. We are enabled to so shape the cam surface 70 that the initial compression of the spring 64 is very slow and gradually increases.

In Figs. 23 to 26 inclusive we show a modified form of the invention wherein a spring device is utilized to effect opening of the breech block instead of the cam device previously described and by means of which spring device we are enabled to effect the opening of the block entirely independent of the counter-recoil springs. In this form of the invention we mount on the left hand side of the gun A in a suitable detachable manner a substantially vertical tubular member 100 the lower end of which is provided with an interior flange 101. Housed in the member 100 is an opening spring 102 which is considerably weaker than the closing spring 64. Extending through the spring 102 is a rod 103 on the upper end of which is a piston 104. The spring 102 bears at its upper end against the piston 104 and at its lower end against the flange 101. The lower end of the rod 103 has secured thereto one end of a chain 106 and the free end of this chain carries an L-shaped member 107 one arm of which engages the flat face 108 of an opening spring arm 109 fixed on the shaft 45. Projecting from the flat face 108 of the arm 109 is a stud 110 which engages in an opening 111 of the member 107.

In this form of the construction the spring 102 is compressed or energized when the block is closed, the greater strength of the spring 64 providing for this. When the gun recoils the operation is the same as that previously described, the latch 74 locking the spring 102 inactive during the energization of the spring 64. Upon tripping of the latch 74 during counter-recoil the spring 102 is released and by its expansion effects the necessary rotation of the shaft 45 to open the block 42. Upon feeding the charge to the gun the greater strength of the spring 64 will cause same to act to both close the block 42 and energize the spring 102.

In this form of the invention it is possible to operate the mechanism entirely by hand by removing both the opening and closing springs, while it is also possible to open the block by hand and energize the closing spring with the assistance of the opening spring.
In Figs. 27 to 31 inclusive we show another modified form of our invention wherein the energization of the closing spring and the opening of the block is accomplished by cam devices but in this instance the cam devices for effecting the foregoing results are both located on the right hand side of the gun. In this form of the invention a cam plate J is secured to the range scale bracket D and the rear end of this plate is supported by a lateral extension 112 formed on a plate 113 also secured to the range scale bracket. Bolts 114 are passed through the extension 112 and through the cam plate J. Pivoted between the plate J and the plate 113 is a cam pallet 115 which is adapted to rest upon the extension 112 when in active position. When it is desired to render the cam pallet 115 inactive it is only necessary to swing same to the position shown in Fig. 30. In this form of the invention the compressor pawl E is provided with a toe 116 which is adapted to ride over the cam pallet during recoil to effect compression of the closing spring 64 as will be obvious. In this form of our invention no latch is provided on the operating handle G but the inner end of said handle is provided with an extension 117 in the free end of which is mounted a yielding roller 118 of the type previously described.

In the operation of this form of our invention the closing spring 64 is energized on recoil by the coaction of the compressor pawl E with the cam pallet 115. During counter-recoil the roller 118 will engage the cam surface 119 on the plate J and effect the necessary rotation of the shaft 45 to open the block. In other respects the form of the invention illustrated in Figs. 27 to 31 is similar to that previously described.

While we have described our invention in the best forms known to us at present it will be obvious that various changes in the details of construction and in the arrangement of parts can be resorted to with the exercise of only ordinary mechanical skill and without departing from the spirit of the invention.

What we claim is:—

1. The combination with a breech loading gun, an operating shaft for the breech mechanism, and a recoil mount; of means for automatically opening the breech mechanism, a closing spring, elements on the gun and mount respectively, coöperating during one portion of recoil to energize said spring independently of the rotation of the shaft and inactive during the remaining portion of recoil, and means for subsequently connecting said spring and shaft.

2. The combination with a breech loading gun, an operating shaft for the breech mechanism, and a recoil mount, of means for automatically opening the breech, a closing spring energized by a force acting longitudinally thereof, a cam device between the gun and mount operated by recoil to energize said spring independently of the rotation of said shaft, and means for subsequently connecting said spring with the shaft.

3. The combination with a breech loading gun, an operating shaft for the breech mechanism, and a recoil mount, of means for automatically opening the breech, a closing spring energized by a force acting longitudinally thereof, a cam device between the gun and mount operated by recoil to energize said spring independently of the rotation of said shaft, and means operated by the opening of the breech mechanism to connect the spring with the shaft.

4. The combination with a breech loading gun, and a recoil mount; of a closing spring for the breech mechanism carried by the gun, a cam device between the gun and mount operated by recoil of the gun to energize said spring, and a second cam device between the gun and mount operated by counter-recoil of the gun to open the breech.

5. The combination with a breech loading gun, an operating shaft for the breech mechanism, and a recoil mount; of a closing spring for the breech mechanism, a compressor pawl loosely mounted on the shaft and operatively connected with said spring, means on the mount for actuating said pawl during movement of the gun to compass said spring, means for automatically opening the breech, and means for operatively connecting said pawl with the operating shaft when the breech is opened.

6. In a breech loading gun, the combination with an operating shaft for the breech mechanism, and a recoil mount, of a closing spring, a cam device between the mount and gun on one side of the latter for energizing said spring during movement of the gun, and a cam device between the shaft and mount on the other side of the gun for opening the breech during movement of the gun.

7. In a breech loading gun, the combination with an operating shaft for the breech mechanism, and a recoil mount; of a closing spring, a cam device between the mount and gun on one side of the latter for energizing said spring during movement of the gun, a cam device on the other side of the gun, and an arm on the shaft coacting with the last named cam device during movement of the gun to effect opening of the breech.

In testimony whereof we affix our signatures, in the presence of two subscribing witnesses.

ARTHUR ADELMAN.
HENRY J. STAMBAUGH.

Witnesses:
H. A. MATSON,
GEORGE M. McCANN.